D. H. COLES.
STEERING GEAR FOR MOTOR VEHICLES.
APPLICATION FILED MAY 9, 1908.
914,019.
Patented Mar. 2, 1909.
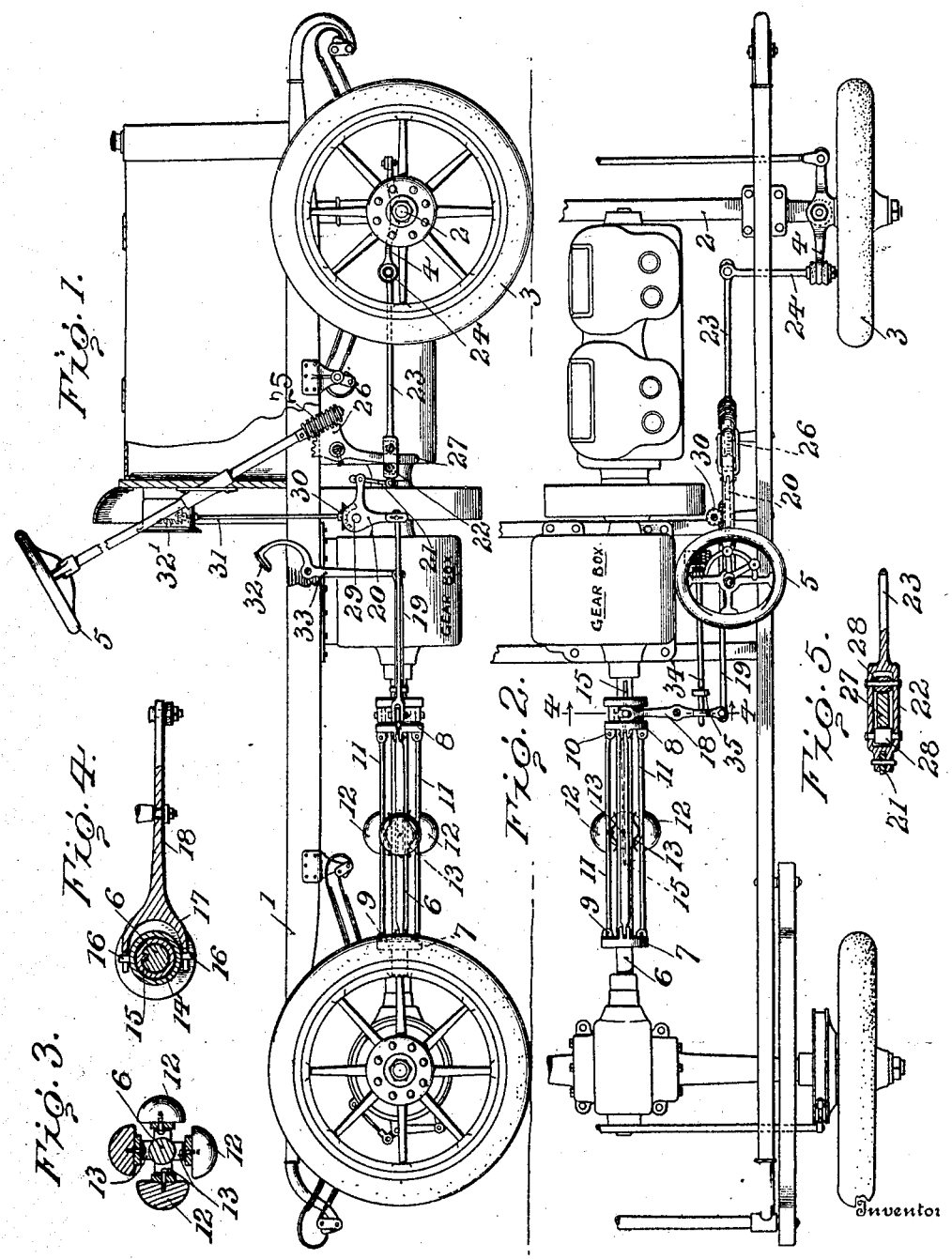

UNITED STATES PATENT OFFICE.

DAVID H. COLES, OF BROOKLYN, NEW YORK.

STEERING-GEAR FOR MOTOR-VEHICLES.

No. 914,019.  Specification of Letters Patent.  Patented March 2, 1909.

Application filed May 9, 1908. Serial No. 431,845.

*To all whom it may concern:*

Be it known that I, DAVID H. COLES, of Brooklyn, New York, have invented new and useful Improvements in Steering-Gears for Motor-Vehicles, which improvements are fully set forth in the following specification.

My invention relates to steering mechanism for power propelled vehicles such as automobiles, and has for its object to provide means whereby a given movement of the steering wheel or other steering device will in a given unit of time produce approximately the same deviation from a straight line at various speeds. In my prior application for steering mechanism for self-propelled vehicles, Serial No. 411,996, filed January 21st, 1908, I have described and claimed a device of this character, the invention therein consisting in the interposition between the steering-wheel (or other means for controlling the steering mechanism) and the steering (front) wheels of the automobile of a lever so arranged that the relative lengths of the two arms of the lever may be changed or varied with the increase or decrease in the speed of movement of the vehicle, to the end that said lever shall operate to turn the wheels at a less angle when the machine is moving at a high rate of speed than when it is moving at a low rate of speed, even though the steering wheel or other corresponding control device is shifted to substantially the same extent in both cases. One of the automatic means therein disclosed for altering the relative lengths of the respective arms of the interposed lever depended upon the action of governor balls rising against the force of gravity under the action of a revolving vertical shaft to effect the change in position of the power arm of the steering lever. While the governor balls revolve about a vertical axis, power is wasted in lifting their dead weight every time the speed increases, and this is in addition to the power which must be imparted to the balls for enabling them to do the work required of them. It is also found that space is not economized below the body of the car by arranging the governor balls to revolve about a vertical shaft in the manner described.

My present invention, which is an improvement on the one described and claimed in my application Serial No. 411,996, has for its primary object to overcome the objections above noted by mounting the governor balls, which, by their centrifugal action, effect the varying of the length of the power arm of the steering lever, on a horizontal shaft such as on the motor drive shaft. By this arrangement the governor balls require no extra power to lift their mass because they revolve in a vertical plane and are balanced against each other. Whatever power is imparted by the drive shaft to effect their movement is effectively utilized in regulating the steering device. The governor occupies but very little space and the power transmitting levers operated by it are hidden by the frame of the car and do not interfere with other mechanism.

A further object of my invention is to provide a simple means controlled by the governor balls for showing the position of the steering gear lever and also indicating the speed of the car.

These and other objects will be more fully explained in the detailed description following.

Certain mechanical expressions of the inventive idea involved are hereinafter specifically described and shown in the accompanying drawings, which are designed merely as illustrations to assist in the description of the invention and not as defining the limits thereof, reference being had to the claims for that purpose.

In said drawings—Figure 1 is a view in side elevation of an automobile, provided with my improved governor in connection with the steering mechanism, certain parts of the vehicle being omitted to better illustrate my improvement. Fig. 2 is a plan view of Fig. 1. Figs. 3, 4 and 5 are transverse sectional details, Fig. 3 being taken through the governor balls, Fig. 4 taken on the line 4—4 of Fig. 2, and Fig. 5 through the head of the steering rod.

Referring to Figs. 1 and 2, 1 indicates the frame of an automobile, 2 the front axle thereof, and 3 the front wheels which, as usual, are connected to the axle so as to have angular adjustment with relation thereto for the purpose of steering the vehicle, the angular adjustment being secured through a lever 4, rigid with the spindle upon which the wheels turn, and which is connected by suitable mechanism with a steering wheel 5.

Mounted on the driving shaft 6, which is preferably horizontal or nearly so, are two collars 7 and 8 one of which is fast to the shaft, and the other splined to and longitudinally movable thereon. In the present illustration collar 7 is made fast and collar 8 is slidable. Both collars are provided with a plurality of hinge members 9, 10. As shown, there are four of these members on each collar, disposed equally around the inner faces thereof. Engaging oppositely disposed hinge members are springs 11, preferably thin and broad with just sufficient rigidity to sustain the weight of the balls 12, 12, but with sufficient elasticity to allow the balls to throw out by centrifugal force when the shaft 6 is revolved. For the purpose of preventing the springs 11 from rattling against the shaft when running on low speed, I provide means such as springs 13, 13, preferably secured to the springs 11, which cushion the contact and render the operation of the governor noiseless. One of the collars 8 is provided with a central reduced bearing portion for receiving a band 14, which permits the collar to turn therein, the collar being provided with a spline 15, Fig. 4, which causes it to revolve with the shaft 6 while permitting longitudinal movement of the collar on the shaft. The band 14 is provided with lugs 16 diametrically disposed for receiving the forked members 17 of a lever 18 pivotally supported from the frame of the car by a hanger, not shown. To the outer arm of lever 18 is hinged a link 19 engaging one arm of a bell crank 20, the other arm of the crank having a link connection 21 with a yoke 22 on the rear end of steering rod 23, the forward end of which has a hinged connection with an arm 24, thereby permitting the yoke end of the rod 23 to move up and down on the curved arm 27 as the speed varies. The arm 24 completes the connection of the rod 23 with lever 4, which directly effects the angular movement of the wheels to the right or left.

Movement is imparted to the steering rod 23 in the present instance by a worm gear 25 on the shaft of the steering wheel 5, meshing with a steering gear 26 provided with a lever arm 27, preferably curved, which enters the yoke 22 to conform to the movement of the rod 23. To reduce friction the yoke may be provided with antifriction means such as antifriction rolls 28, Fig. 5, or they may be omitted. While I have shown and described a worm gear for actuating the arm 27, any other means may be used for this purpose, under control of the operator.

The operation of the governor in controlling the steering mechanism will be readily understood. When the machine is moving at a low rate of speed, the parts of the governor and steering mechanism will occupy the position shown in Figs. 1 and 2. If now the operator desires to turn the machine from the right line in which he is moving, he will turn the steering wheel 5 in the proper direction, and thereby swing the depending lever arm 27 to move the steering rod 23, which through its connections with the steering wheels gives to them a corresponding angular turn. If the speed of the machine is increased, centrifugal force will cause the balls 12 to move outward on radial lines from the drive shaft 6 against the tension of springs 11, causing the latter to bow outward while hinging at their ends and pull splined collar 8 rearward on the drive shaft, and with it the loose collar 14 and inner arm of lever 18 which acts through link 19, bell crank 20, and link 21 to lift the yoke end of steering rod 23. The result of thus shifting the position of the yoke 22 on arm 27 is to shorten the effective radius of the arm 27 whereby the same angular movement of the steering wheel 5 will impart less rectilinear movement to the steering rod 23 than in its former position. The front wheels will therefore have less angular movement imparted to them even though the angular movement of the steering-wheel be the same. On reduction of speed the governor balls under action of the long springs 11 return to their original position, but are prevented from clattering on the shaft because of the cushion springs 13.

It will be observed that practically no energy of the drive shaft is required in lifting the balls as the speed increases, for the reason that the governor balls are disposed in pairs, about a horizontal shaft, the weights of the balls of each pair balancing each other. The governor is thereby enabled to begin its action with less expenditure of power from the drive shaft, and responds quickly to any changes of speed.

I have also provided means which functionate with the centrifugal governor for indicating the speed of the car, and also the position of the steering rod on the steering gear lever. For this purpose the elbow of the bell crank 20 is provided with a segmental gear 29, meshing with a bevel gear 30 on a stem 31 entering a case 32' containing the usual dial and pointer of a speedometer or indicator. Since the movement of the bell crank 20 is dependent upon the centrifugal action of the governor balls 12 and this movement in turn depends on the speed of the drive shaft 6, which determines the speed of the vehicle, I am enabled in a simple manner to determine the speed of the car and also the position of the steering rod on the steering gear lever.

In order that the operation of the governor may be controlled at will to permit the steering gear to perform its full function or to limit its action, a device is provided which enables the operator to control the centrifugal governor or even throw it out of action. This device consists of a lever located accessible to the operator, and preferably in form of a pedal 32 pivotally supported on the frame 1 and having an arm 33 hinged to a push rod 34 extending rearward to engage the work-arm of the lever 18. On push rod 34 and at a suitable distance from its end is a lug or stop 35. When it is desired to throw the centrifugal governor out of operation, the pedal 32 is pressed down, thereby causing the stop 35 to bear against the work arm of lever and prevent its movement by the governor.

Instead of mounting the governor balls directly on the drive shaft, I may mount them on any other support, and cause them to rotate by power taken from any moving part of the vehicle, provided the governor balls are so arranged as to require little or no part of such power to be used in lifting the balls against gravity. For example, it is within the scope of my invention to revolve the governor balls in a horizontal plane while supporting their weight on horizontal arms on which the balls may slide under centrifugal force, and thereby vary the action of the steering means.

What I claim is:—

1. In steering mechanism for self-propelled vehicles having wheels which are turned to effect the steering thereof, the combination of steering mechanism to effect the steering movement, a centrifugal ball governor and connecting means between the same and said steering mechanism, said governor responding to change of speed of the vehicle and uninfluenced by the force of gravity for varying the action of said steering mechanism according to said speed variation.

2. In steering mechanism for self-propelled vehicles having wheels which are turned to effect the steering thereof, the combination with such wheels, of a manually operable gear having a lever arm, a steering rod loosely engaging said arm for transmitting power to said wheels to effect the steering movement, and automatic means for varying the position of said rod on said arm according to speed variations of the vehicle.

3. In steering mechanism for self-propelled vehicles having wheels which are turned to effect the steering thereof, the combination with such wheels, of a manually operable gear having a lever arm, a steering rod loosely engaging said arm for transmitting power to said wheels to effect the steering movement, and a horizontal centrifugal ball governor responding to changes of speed of the vehicle in operative connection with said rod to shift the latter on said lever arm.

4. In steering mechanism for self-propelled vehicles having wheels which are turned to effect the steering thereof, the combination with such wheels, of a manually operable power device, a steering rod operated thereby, a horizontal centrifugal ball governor responding to variations of speed operatively connected to said steering rod for varying its throw according to speed variations of the vehicle.

5. In steering mechanism for self-propelled vehicles having wheels which are turned to effect the steering thereof, the combination with such wheels, of a manually operable power device, mechanism transmitting power from said device to said wheels to effect the steering movements, a centrifugal ball governor means connecting the same with said mechanism, said governor responding to changes of speed of the vehicle for varying the action of said mechanism, and means under control of the operator for throwing said governor in or out of action.

6. In steering mechanism for self-propelled vehicles having wheels which are turned to effect the steering thereof, the combination with such wheels, of a manually operable power device, a steering rod operated thereby, a centrifugal governor responding to variations of speed of the vehicle operatively connected to said steering rod to vary its throw according to said speed variations, and a dial hand operated by said governor.

7. In steering mechanism for self-propelled vehicles having wheels which are turned to effect the steering thereof, the combination with such wheels, of a manually operable power device, means transmitting power from said device to said wheels to effect the steering movement, a centrifugal governor responding to variations of speed of the vehicle for varying the action of said transmitting means, and an indicating dial in operative connection with said governor.

8. In combination, hand-operated steering means for an automobile, a horizontal driving shaft provided with a fixed and a movable collar, hinged springs connecting said collars, each of said springs supporting a centrifugal governor ball, and provided with a cushion spring normally pressing on said shaft, and means connecting said last-named collar with said steering means for varying its action according to speed variations, 9. In steering mechanism for self-propelled vehicles having wheels which are turned to effect the steering thereof, the combination with such wheels, of a manually operable power device, a steering rod operated thereby a bell crank provided with a rack for engaging an indicator drive gear, and means responding to the speed of the vehicle operating said crank to vary the throw of said steering rod and to turn said drive gear.

10. In combination, steering mechanism for a self-propelled vehicle, means subject to speed variations of said vehicle governing the action of said mechanism, and means controlled by the operator for varying the extent of action of said governing means.

In testimony whereof I have signed this specification in the presence of two subscribing witnesses.

DAVID H. COLES.

Witnesses:
RALPH L. SCOTT,
W. H. HARTING.